(12) United States Patent
Liu

(10) Patent No.: US 11,996,032 B1
(45) Date of Patent: May 28, 2024

(54) DISPLAY MODULE AND ELECTRICAL TERMINAL

(71) Applicant: Shenzhen China Star Optoelectronics Semiconductor Display Technology Co., Ltd., Guangdong (CN)

(72) Inventor: Fangyun Liu, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/191,762

(22) Filed: Mar. 28, 2023

(30) Foreign Application Priority Data

Dec. 27, 2022 (CN) .......................... 202211690219.X

(51) Int. Cl.
  *G09G 3/20* (2006.01)
  *G09G 3/3275* (2016.01)
  *G09G 3/36* (2006.01)

(52) U.S. Cl.
  CPC ......... *G09G 3/2096* (2013.01); *G09G 3/3275* (2013.01); *G09G 3/3688* (2013.01); *G09G 2310/0275* (2013.01); *G09G 2310/08* (2013.01); *G09G 2330/021* (2013.01); *G09G 2330/06* (2013.01)

(58) Field of Classification Search
  CPC ......... G09G 2310/08; G09G 2330/021; G09G 2330/06; G09G 2310/0275; G09G 3/2096; G09G 3/3275; G09G 3/3677; G09G 3/3688
  See application file for complete search history.

(56) References Cited

U.S. PATENT DOCUMENTS

| | | | | |
|---|---|---|---|---|
| 10,204,548 | B2* | 2/2019 | Lee | G09G 3/28 |
| 11,270,653 | B2* | 3/2022 | Kim | G09G 3/3275 |
| 11,626,054 | B2* | 4/2023 | Park | G09G 3/3266 |
| | | | | 345/204 |
| 2018/0061294 | A1* | 3/2018 | Kim | G09G 3/367 |
| 2019/0057626 | A1* | 2/2019 | Lee | G09F 3/208 |
| 2020/0005724 | A1* | 1/2020 | Na | G09G 3/3688 |
| 2021/0375214 | A1* | 12/2021 | Kim | G09G 5/10 |

* cited by examiner

*Primary Examiner* — Dismery Mercedes
(74) *Attorney, Agent, or Firm* — PV IP PC; Zhigang Ma; Wei Te Chung

(57) ABSTRACT

A display module includes a display panel, a power management circuit, a source driving circuit, and a signal processing circuit. The display panel includes a plurality of pixel units. The power management circuit generates a first signal. The source driving circuit is electrically connected to the plurality of pixel units. The signal processing circuit, electrically connected between the source driving circuit and the power management circuit, is configured to process the first signal into a second signal and load the second signal to the source driving circuit. An energy of the second signal is different from an energy of the first signal.

9 Claims, 2 Drawing Sheets

DISPLAY MODULE AND ELECTRICAL TERMINAL

CROSS REFERENCE TO RELATED APPLICATION

This application claims the priority of Chinese Patent Application No. 202211690219.X, entitled "DISPLAY MODULE AND ELECTRICAL TERMINAL", filed on Dec. 27, 2022, the disclosure of which is incorporated herein by reference in its entirety.

FIELD OF THE DISCLOSURE

The present disclosure relates to a display technology, and more particularly, to a display module and an electrical terminal.

BACKGROUND

The display module is equipped with a variety of driving chips. When the source driver chips transmit signals in a certain frequency range, the energy of the signals in the frequency range may be more concentrated and large. Thus, it is easier to generate Electromagnetic Interference (EMI) radiation, which will affect the normal operation of other systems or other subsystems in this system. Or, when the energy of the signals in the frequency range is small, there may be issues that the signals cannot be accurately transmitted due to attenuation, which limits the usage scope of the display module.

Therefore, the source driver in the conventional display module has the issues of EMI radiation and needs to be improved.

SUMMARY

One objective of an embodiment of the present disclosure is to provide a display module and an electrical terminal to solve the above-mentioned technical issue that the energy of some signals in the conventional display module is concentrated and large, resulting in EMI radiations in the source drivers or that the signals cannot be accurately transmitted due to their small energy.

According to an embodiment of the present disclosure, a display module is disclosed. The display module includes a display panel, a power management circuit, a source driving circuit, and a signal processing circuit. The display panel includes a plurality of pixel units. The power management circuit generates a first signal. The source driving circuit is electrically connected to the plurality of pixel units. The signal processing circuit, electrically connected between the source driving circuit and the power management circuit, is configured to process the first signal into a second signal and load the second signal to the source driving circuit. An energy of the second signal is different from an energy of the first signal.

In another embodiment of the present disclosure, the energy of the second signal is less than the energy of the first signal.

In another embodiment of the present disclosure, the first signal comprises a first sub-signal and a second sub-signal. The second signal comprises a third sub-signal and a fourth sub-signal. The signal processing circuit includes a first sub-signal processing circuit that is configured to be loaded with the first sub-signal generated by the power management circuit and process the first sub-signal into the third sub-signal loaded into the source driving circuit. An energy of the third sub-signal is less than an energy of the first sub-signal.

In another embodiment of the present disclosure, a difference between the energy of the third sub-signal and the energy of the first sub-signal is greater than a difference between an energy of the fourth sub-signal and an energy of the second sub-signal.

In another embodiment of the present disclosure, the first sub-signal processing circuit comprises an impedance step-down circuit and a low-dropout regulator.

In another embodiment of the present disclosure, the signal processing circuit further includes a second sub-signal processing circuit that is configured to be loaded with a second sub-signal generated by the power management circuit and process the second sub-signal into the fourth sub-signal loaded into the source driving circuit. An energy of the fourth sub-signal is less than an energy of the second sub-signal.

In another embodiment of the present disclosure, the second sub-signal processing circuit comprises an impedance step-down circuit and a low-dropout regulator.

In another embodiment of the present disclosure, the first sub-signal comprises an analog voltage signal, and the second sub-signal comprises a digital voltage signal.

In another embodiment of the present disclosure, the source driving circuit includes a transistor, having a gate, a source and a drain, wherein the source or the drain is grounded, and the gate is electrically connected to the signal processing circuit. The second signal is a voltage signal, and a voltage level the gate is positively correlated with a voltage level corresponding to the second signal.

In another embodiment of the present disclosure, the display module further includes a control main board comprising the power management circuit. The source driving circuit is positioned between the plurality of pixel units and the control main board. The signal processing circuit is disposed on the control main board.

In another embodiment of the present disclosure, the display module further includes a control main board comprising the power management circuit. The source driving circuit is positioned between the plurality of pixel units and the control main board. A flexible flat cable and a connection plate are provided between the source driving circuit and the control main board, the flexible flat cable is connected between the control main board and the connection plate, and the signal processing circuit is disposed on the connection plate.

According to an embodiment of the present disclosure, an electrical terminal includes a display module. The display module includes a display panel, a power management circuit, a source driving circuit, and a signal processing circuit. The display panel includes a plurality of pixel units. The power management circuit generates a first signal. The source driving circuit is electrically connected to the plurality of pixel units. The signal processing circuit, electrically connected between the source driving circuit and the power management circuit, is configured to process the first signal into a second signal and load the second signal to the source driving circuit. An energy of the second signal is different from an energy of the first signal.

In another embodiment of the present disclosure, the energy of the second signal is less than the energy of the first signal.

In another embodiment of the present disclosure, the first signal comprises a first sub-signal and a second sub-signal. The second signal comprises a third sub-signal and a fourth sub-signal. The signal processing circuit includes a first sub-signal processing circuit that is configured to be loaded with the first sub-signal generated by the power management circuit and process the first sub-signal into the third sub-signal loaded into the source driving circuit. An energy of the third sub-signal is less than an energy of the first sub-signal.

In another embodiment of the present disclosure, a difference between the energy of the third sub-signal and the energy of the first sub-signal is greater than a difference between an energy of the fourth sub-signal and an energy of the second sub-signal.

In another embodiment of the present disclosure, the first sub-signal processing circuit comprises an impedance step-down circuit and a low-dropout regulator.

In another embodiment of the present disclosure, the signal processing circuit further includes a second sub-signal processing circuit that is configured to be loaded with a second sub-signal generated by the power management circuit and process the second sub-signal into the fourth sub-signal loaded into the source driving circuit. An energy of the fourth sub-signal is less than an energy of the second sub-signal.

In another embodiment of the present disclosure, the second sub-signal processing circuit comprises an impedance step-down circuit and a low-dropout regulator.

In another embodiment of the present disclosure, the first sub-signal comprises an analog voltage signal, and the second sub-signal comprises a digital voltage signal.

In another embodiment of the present disclosure, the source driving circuit includes a transistor, having a gate, a source and a drain, wherein the source or the drain is grounded, and the gate is electrically connected to the signal processing circuit. The second signal is a voltage signal, and a voltage level the gate is positively correlated with a voltage level corresponding to the second signal.

In another embodiment of the present disclosure, the display module further includes a control main board comprising the power management circuit. The source driving circuit is positioned between the plurality of pixel units and the control main board. The signal processing circuit is disposed on the control main board.

In another embodiment of the present disclosure, the display module further includes a control main board comprising the power management circuit. The source driving circuit is positioned between the plurality of pixel units and the control main board. A flexible flat cable and a connection plate are provided between the source driving circuit and the control main board, the flexible flat cable is connected between the control main board and the connection plate, and the signal processing circuit is disposed on the connection plate.

The present disclosure provides a display module and a driving method thereof. By providing a signal processing circuit electrically connected between the source driving circuit and the power management circuit to be loaded with the first signal generated by the power management circuit and to process the first signal processing into a second signal loaded into the source driving circuit, the energy of the second signal could be different from the energy of the first signal. By reasonably arranging the signal processing circuit, the second signal increases or decreases compared with the first signal. This can reduce the EMI radiations generated by the source driving circuit or improve the issue that the signals cannot be accurately transmitted due to their small energy and thus effectively expands the usage scope of the display module.

BRIEF DESCRIPTION OF THE DRAWINGS

The technical solutions and other beneficial effects of the present application will be apparent from the detailed description of the specific embodiments of the present application with reference to the accompanying drawings.

DETAILED DESCRIPTION OF PREFERRED EMBODIMENTS

The specific structural and functional details disclosed herein are representative only and are for the purpose of describing exemplary embodiments of the present application. However, the present application may be embodied in many alternative forms and should not be construed as being limited only to the embodiments set forth herein.

It is understood that the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

It should be understood that, when an element or layer is referred to herein as being "disposed on", "connected to" or "coupled to" another element or layer, it can be directly disposed on, connected or coupled to the other element or layer, or alternatively, that intervening elements or layers may be present. In contrast, when an element is referred to as being "directly disposed on," "directly connected to" or "directly coupled to" another element or layer, there are no intervening elements or layers present. In the figures, like numbers refer to like elements throughout.

It will be further understood that the term "and/or" includes any and all combinations of one or more of the associated listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present application are illustrated in detail in the accompanying drawings.

Figure 1:
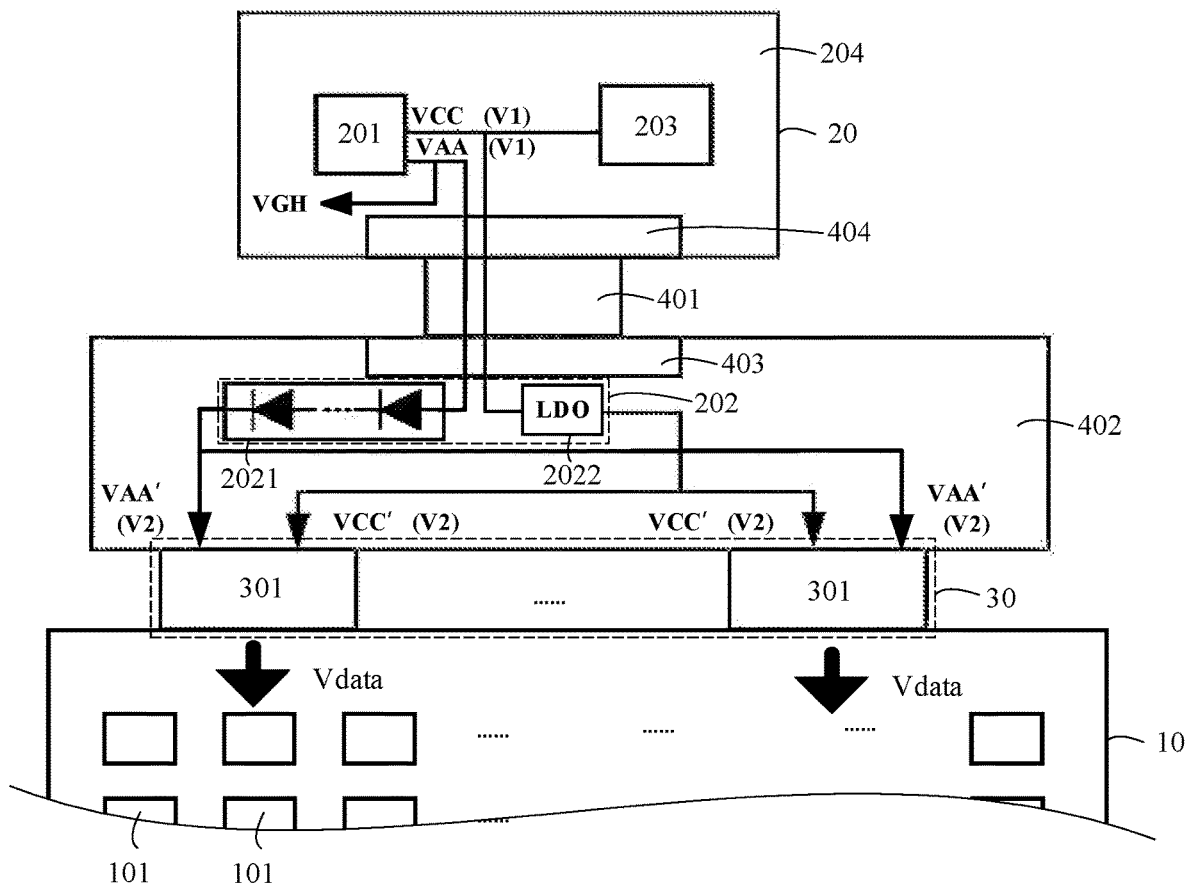
FIG. 1 is a top-down view of an unfolded display module according to an embodiment of the present disclosure.
Figure 2:
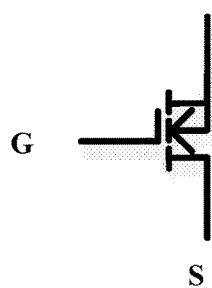
FIG. 2 is a diagram of the structure of the transistor in the source driving circuit according to an embodiment of the present disclosure.

Please refer to FIG. 1. FIG. 1 is a top-down view of an unfolded display module according to an embodiment of the present disclosure. As shown in FIG. 1, the display module 100 comprises a display panel 10, a power management circuit 201, a signal processing circuit 202 and a source driving circuit 30. The display panel 10 includes a plurality of pixel units. The source driving circuit 30 is electrically connected between the plurality of pixel units and a control main board 20. The signal processing circuit 202 is electrically connected between the source driving circuit 30 and the power management circuit 201 and is used to process the first signal V1 generated by the power management circuit into a second signal V2 and load the second signal V2 into the source driving circuit 30. The energy of the second signal V2 is different from the energy of the first signal V1. The display module 100 may include the control main board 20. The control main board 20 may include the power management circuit 201. The source driving circuit 30 is placed between the plurality of pixel units and the control main board 20. The signal processing circuit 202 may be disposed on the control main board 20.

The display panel 10 may include, but not limited to, a liquid crystal display panel, an organic electroluminescent display panel, a light-emitting diode display panel, a sub-millimeter light-emitting diode display panel, a micron light-emitting diode display panel. The source driving circuit 30 is electrically connected to a plurality of pixel units and a control main board 20. The source driving circuit 30 can be controlled by the control main board 20 to input corresponding data signal Vdata to each sub-pixel 101 in the pixel unit to control the corresponding color displayed by each pixel unit such that the display panel 10 could display an image.

If the first signal V1 generated by the power management circuit 201 in the control main board 20 is directly applied to the source driving circuit 30, because the first signal V1 has an AC signal with a larger energy and the source driving circuit 30 has it's a specific structure, the energy of the signal transmitted in the source driving circuit 30 may be concentrated in a certain frequency range. This is easy to produce EMI radiation, which affects the normal operation of other systems or other subsystems in the system. Thus, the usage scope of the display module 100 is limited.

In this embodiment, a signal processing circuit 202 is arranged and electrically connected between the source driving circuit 30 and the power management circuit 201. The signal processing circuit 202 could process the first signal V1 generated by the power management circuit 201 into a second signal V2 loaded into the source driving circuit 30.

The energy of the second signal V2 is different from the energy of the first signal V1. That is, the signal processing circuit 202 may process the first signal V1 generated by power management circuit 201 generated by the signal and then load the processed second signal V2 to the source driving circuit 30 to change the energy so that the second signal V2 loaded to the source driving circuit 30 can at least reduce the EMI radiation generated by the source driving circuit 30. This could avoid reducing the usage range of the display module 100.

In an embodiment, the signal processing circuit 202 could be reasonably configured according to the signal energy requirements of the source driving circuit 30 to process the first signal V1 generated by the power management circuit 201. Here, the relationship between the energy of the second signal V2 and the energy of the first signal V1 is not limited as long as they are different. For example, if the energy of the signal transmitted in the source driving circuit 30 comparatively concentrates in a certain frequency range, it means the source driving circuit 30 requires a comparatively low signal energy. At this time, the signal processing circuit 202 may be set to make the second signal V2 have a lower energy than the first signal V1. For example, when the energy of the signal transmitted in the source driving circuit 30 in a certain frequency range is comparatively low, it means the energy of the signal required by the source driving circuit 30 is comparatively large. At this time, the signal processing circuit 202 may be set to make the second signal V2 have greater energy than the first signal V1.

As shown in FIG. 1, the first signal V1 includes a first sub-signal VAA and a second sub-signal VCC. The second signal V2 includes a third sub-signal VAA' and a fourth sub-signal VCC'. The signal processing circuit 202 comprises: a first sub-signal processing circuit 2021 and a second sub-signal processing circuit 2022. The first sub-signal processing circuit 2021 receives the first sub-signal VAA generated by the power management circuit 201 and process the first sub-signal VAA to the third sub-signal VAA' loaded into the source driving circuit 30. The energy of the third sub-signal VAA' is lower than the energy of the first sub-signal VAA. The second sub-signal processing circuit 2022 receives the second sub-signal VCC generated by the power management circuit 201 and process the second sub-signal VCC into the fourth sub-signal VCC' loaded into the source driving circuit 30. The energy of the fourth sub-signal VCC' is lower than the energy of the second sub-signal VCC.

The first signal V1 includes the first sub-signal VAA and the second sub-signal VCC. The first sub-signal processing circuit 2021 and the second sub-signal processing circuit 2022 are respectively used to process the first sub-signal VAA and the second sub-signal VCC. On the other hand, the source driving circuit 30 could correspondingly process each signal according to the energy requirements of each signal, so that the first sub-signal processing circuit 2021 processes the first sub-signal VAA to generate the third sub-signal VAA'. Similarly, the second sub-signal processing circuit 2022 processes the second sub-signal VCC to generate the fourth sub-signal VCC'. The third sub-signal VAN and the fourth sub-signal VCC' could meet the needs of different devices of the source driving circuit 30. This further improves the reliability of processing the first signal V1 and further expands the usage scope of the display module 100.

The energy of the second sub-signal VCC is lower than the energy of the first sub-signal VAA. The first sub-signal processing circuit 2021 and the second sub-signal processing circuit 2022 may process the signals according to the different characteristics of these signals. For example, in this embodiment, the energy of the signal that the first sub-signal processing circuit 2021 is capable of processing (e.g., the energy of the first sub-signal VAA) may be set to be greater than the signal that the second sub-signal processing circuit 2022 is capable of processing (e.g., the energy of the second sub-signal VCC).

When there is a difference between the energy of the second sub-signal VCC and the energy of the first sub-signal VAA, especially when the difference is large, the first sub-signal processing circuit 2021 and the second sub-signal processing circuit 2022 could process the first sub-signal VAA and the second sub-signal VCC respectively. This could raise the reliability when the signal processing circuit 202 processes the first signal VA because the same sub-signal processing circuit may not process the first sub-signal VAA and the second sub-signal VCC when the difference between the energy of the second sub-signal VCC and the energy of the first sub-signal VAA is too large, resulting in the energy of the second sub-signal VCC cannot meet the energy requirement of the source driving circuit 30.

As shown in FIG. 1, the difference between the energy of the third sub-signal VAA and the energy of the first sub-signal VAA is greater than the difference between the energy of the fourth sub-signal VCC' and the energy of the second sub-signal VCC. The first sub-signal processing circuit 2021 and the second sub-signal processing circuit 2022 may process each signal according to, including but not limited to, the energy requirements of the source driving circuit 30.

For example, in this embodiment, the ability of the first sub-signal processing circuit 2021 to perform energy changes on the signal (e.g., the processing to change the energy of the first sub-signal VAA into the energy of the third sub-signal VAA') could be set to be greater than the ability of the second sub-signal processing circuit 2022 to perform energy changes on the signal (e.g., the processing to change the energy of the second sub-signal VCC into the energy of the fourth sub-signal VCC ').

When a difference between the different between the energy of the third sub-signal VAA' and the energy of the first sub-signal VAA and the difference between the energy of the fourth sub-signal VCC' and the energy of the second sub-signal VCC, especially when the difference is large, the first sub-signal processing circuit 2021 and the second sub-signal processing circuit 2022 are arranged to process separately. Similarly, this arrangement could raise the reliability of the signal processing circuit 202 to process the first signal V1 because the same sub-signal processing circuit may not process the first sub-signal VAA and the second sub-signal VCC when the difference between the energy of the second sub-signal VCC and the difference between the different between the energy of the third sub-signal VAA' and the energy of the first sub-signal VAA and the difference between the energy of the fourth sub-signal VCC' and the energy of the second sub-signal VCC is too large, resulting in the energy of the second sub-signal VCC cannot meet the energy requirement of the source driving circuit 30.

As shown in FIG. 1, the first sub-signal processing circuit 2021 includes an impedance step-down circuit, and the second sub-signal processing circuit 2022 comprises a low-dropout regulator.

The impedance step-down circuit (in the first sub-signal processing circuit 2021) includes at least one diode. For example, it may also include a plurality of diodes connected in series as shown in FIG. 1. When the diode is forward biased and conductive, there will be a certain voltage drop across its two ends and the voltage drop is almost unchanged. Different types of diodes have different voltage drop, generally in the range of 0.5V to 0.7V, so the impedance step-down circuit in this embodiment can be implemented with a diode or a plurality of diodes connected in series to achieve the voltage drop. In the impedance step-down circuit, the current flowing through each diode cannot exceed its maximum forward current to avoid overcurrent damage to the diode. The impedance step-down circuit can also include resistors connected in parallel.

Specifically, the low-dropout regulator with small power consumption usually has a low self-noise and a high power supply rejection ratio. The basic operating principle is as follows: the system is powered on, if the enable pin is at a high voltage level, the circuit starts to work. The constant current source circuit provides a bias to the entire circuit, and the reference voltage source is quickly established. The output continues to increase with the input. When the output is about to reach the specified value, the output feedback voltage obtained by the feedback network is also close to the reference voltage value. At this time, the error amplifier will amplify the error small signal between the output feedback voltage and the reference voltage, and then regulating transistor will amplify the signal and output the amplified signal to the output to form a negative feedback loop. This ensures that the output voltage is stable at the specified value. Similarly, if the input voltage changes or the output current changes, this closed-loop loop will keep the output voltage unchanged. That is, Vout=(R1+R2)/R2×Vref, thereby achieving a regulated output.

The first signal V1 and the second signal V2 can be voltage signals. The signal processing circuit 202 may be used for voltage conversion to boost or step down the first signal V1 to obtain a second signal V2. In contrast to the first signal V1, the second signal V2 is loaded into the source driving circuit 30 to generate different current signals to change the magnitude of the current passing through the source driving circuit 30. Combined with the principle of electromagnetism, this may change (e.g., to weaken) the EMI radiations generated by the source driving circuit 30.

As shown in FIG. 1, the first sub-signal VAA is also used to generate a high-voltage signal VGH to load into the GOA circuit of the display panel 10. The second sub-signal VCC is further configured to be loaded into the timing control module 203 of the control main board 20. The control main board 20 may include a main board body 204. The main board body 204 is used to carry the power management circuit 201, the timing control module 203 and other integrated circuits or chips. At least one of the GOA circuit and the source driving circuit 30 may be arranged on the display panel 10 or could be electrically connected to the display panel 10 by, but not limited to, bonding. For example, the GOA circuit can control multiple rows of sub-pixels 101 to turn on sequentially to cooperate with the source driving circuit 30 to load the data signal Vdata of the sub-pixels 101 to the corresponding rows of sub-pixels 101 in turn. Here, the GOA circuit and the source driving circuit 30 may be electrically connected to the timing control module 203 such that the data signal Vdata of the sub-pixels 101 could be inputted to the corresponding rows of sub-pixels 101 in turn under the control of the timing control module 203.

The first sub-signal VAA may be a high voltage signal VGH generated by, but not limited to, the DC-DC power supply module. The DC-DC power module may also be disposed on the main board body 204. For example The DC-DC power supply module can be directly mounted on the main board body 204. Furthermore, the power management circuit 201 may also generate other voltage signals different from the first signal V1. These voltage signals, such as a low-voltage signal VGL, could be also generated by, but not limited to, the DC-DC power module. The high-voltage signal VGH and the low-voltage signal VGL can be loaded into the GOA circuit to drive the GOA circuit. The second sub-signal VCC may include, but is not limited to, an image data signal Vdata, which may be loaded into the timing control module 203 and then converted by the timing control module 203 to generate signals, including above-mentioned multiple data signals Vdata of the sub-pixels 101 and corresponding control signals. In addition, in conjunction with the above mentioned the third sub-signal VAA' loaded to the source driving circuit 30, the source driving circuit 30 could be controlled to transmit data signals Vdata to the sub-pixels 101.

The first sub-signal VAA includes an analog voltage signal, and the second sub-signal VCC includes a digital voltage signal. The analog voltage signal (in the first sub-signal VAA) may be transmitted to, but not limited to, an ADC or an analog signal sampling device to generate a corresponding digital voltage signal, or directly transmitted in the analog form to a next stage. In this embodiment, the third sub-signal VAA' could be an analog voltage signals or a digital voltage signal and there is no limitation herein. The digital voltage signal (included in the second sub-signal VCC) may be transmitted to, but not limited to, a DAC or an analog signal generator to generate the corresponding analog voltage signal, or may be directly transmitted in a digital form to a next stage. In this embodiment, the fourth sub-signal VCC' could be an analog voltage signals or a digital voltage signal and there is no limitation herein.

The source driving circuit 30 includes a transistor 302. The source S or the drain D of the transistor 302 is grounded, and the gate G of the transistor 302 is electrically connected to the signal processing circuit 202. The second signal V2 is a voltage signal. The voltage level of the gate G of the transistor 302 is related to the voltage level of the second signal V2. The transistor 302 may be a switching transistor.

The source driving circuit 30 may include a plurality of sub-source driving circuits 30. Each sub-source driving circuit 30 may be electrically connected to the corresponding plurality of sub-pixels 101 to transmit a plurality of corresponding data signals Vdata. Further, each sub-source driving circuit 30 may include a plurality of transistors 302, which include at least one of the above-mentioned transistor 302. Specifically, according to the current formula Id=½*β* (W/L)*(VGS−VTH)² (β is the AC current amplification coefficient of the transistor and indicates the current amplification ability of the transistor to the AC changing signal, "W/L" is the width and length ratio of the transistor, VGS is the voltage difference between the gate and source of the transistor, and VTH is the threshold voltage of the transistor), it could be understood that β, "W/L" and VTH are all constants. Thus, from the above formula, it can be seen that the current Id of transistor 302 is positively correlated to the voltage difference VGS between the gate and source of the transistor 302. Here, the voltage level of the drain D of the transistor 302 may also be related to the voltage level of the second signal V2.

In this embodiment, the source S of the transistor 302 is grounded as an example for further illustration. The gate G of the transistor 302 is electrically connected to the signal processing circuit 202, and the voltage level of the gate G of the transistor 302 is positively correlated to the voltage level of the second signal V2. That is, it can be understood that the current Id of the transistor 302 is related to the voltage level of the second signal V2. From the above, it can be seen that the signal processing circuit 202 may be reasonably configured to process the first signal V1 generated by the power management circuit 201. For example, it may be set to make the second signal V2 have a greater energy than the first signal V1. In this way, because the second signal V2 is applied to the sub-source driver module 30 instead of the first signal V1, the voltage difference VGS between the gate and the source of the transistor 302 is reduced, thereby reducing the current Id of the transistor 302. Since the current Id is reduced, the EMI radiation generated by the source drive module 30 is also adjusted (reduced) accordingly.

Figure 3:
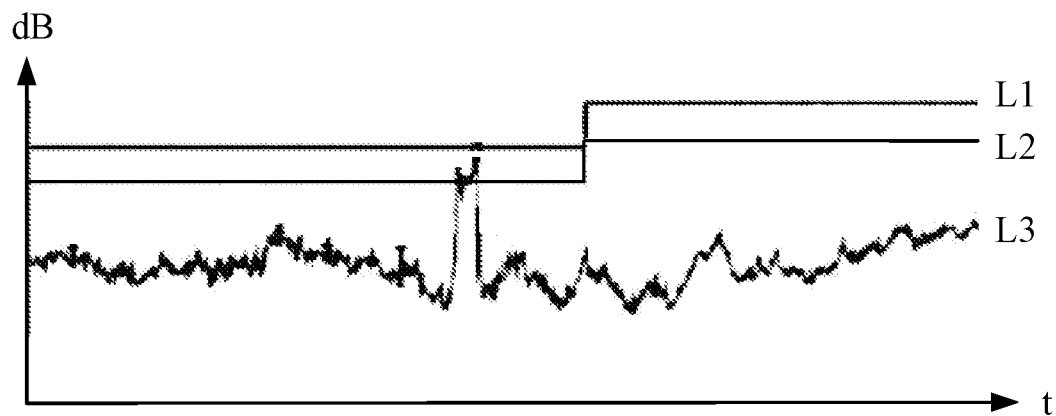
FIG. 3 is a diagram of a waveform of EMI radiations measured by the source driving circuit according to the conventional art.
Figure 4:
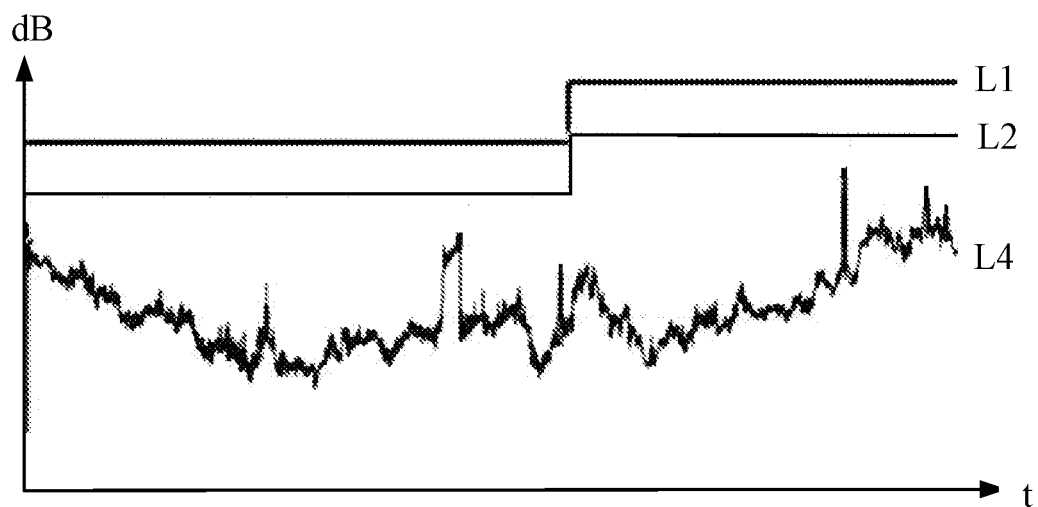
FIG. 4 is a diagram of a waveform of EMI radiations measured by the source driving circuit according to the present disclosure.

Please refer to FIG. 3 and FIG. 4. FIG. 3 is a diagram of a waveform of EMI radiations measured by the source driving circuit according to the conventional art. FIG. 4 is a diagram of a waveform of EMI radiations measured by the source driving circuit according to the present disclosure. Here, the abscissa represents the time t (where the unit of the time is not limited), and the ordinate represents the statistic in dB. The waveforms L1 in FIG. 3 and FIG. 4 are respectively the critical waveforms of the EMI radiation. Here, the region above the waveform L1 means that the EMI radiation is excessive. The waveforms L2 in FIG. 3 and FIG. 4 shows waveforms that is 6 dB lower than the waveforms L1.

In FIG. 3, since the conventional art does not have the signal processing circuit 202, the energy of the signal loaded into the source driving circuit 30 is comparatively larger. The amplitude of the first EMI radiation waveform L3 is large. As shown in FIG. 3, a part of the waveform L3 exceeds waveform L2, and the minimum spacing between the waveform L3 and waveform L1 is 1.62 dB. Thus, the first EMI radiation waveform L3 is not qualified. In FIG. 4, an embodiment includes the signal processing circuit 202. Accordingly, the energy of the signal loaded to the source driving circuit 30 is comparatively small, and the amplitude in the second EMI radiation waveform L4 is lower than that of the first EMI radiated waveform L3. As shown in FIG. 4, the second EMI radiation waveform L4 is below waveform L2 and the spacing between the second EMI radiation waveform L4 and the waveform L1 is greater than 6 dB. Thus, the second EMI radiation waveform L4 is qualified.

In this embodiment, the source driving circuit 30 is electrically connected to the display panel 10 by bonding as an example. As shown in FIG. 1, the sub-source driving circuits 30 with spaces in-between could be connected to at least one side of the display panel 10. In addition, the source driving circuit 30 and the control main board 20 may be provided with a flexible flat cable 401 and a connection plate 402. The flexible flat cable 401 is connected between the control main board 20 and the connection plate 402. The connection plate 402 may be provided with a first pin 403 at the side close to the flexible flat cable 401. The control main board 20 could be provided with a second pin 404 at the side close to the flexible flat cable 401. The plugs at two ends of the flexible flat cable 401 may be electrically connected to the first pin 403 and the second pin 404, respectively, to realize an electrical connection between the control main board 20 and the connection plate 402. Here, the flexible flat cable 401 may also be replaced by a flexible printed circuit. Further, the signal processing circuit 202 may be disposed on the connection plate 402. The side of the connection plate 402, which is close to the source driving circuit 30 and the side of the source driving circuit 30, which is close to the connection plate 402, may also be electrically connected by, but not limited to, pin connection.

According to an embodiment of the present disclosure, an electrical terminal is disclosed. The electrical terminal includes the aforementioned display module.

The present disclosure provides a display module and a driving method thereof. By providing a signal processing circuit electrically connected between the source driving circuit and the power management circuit to be loaded with the first signal generated by the power management circuit and to process the first signal processing into a second signal loaded into the source driving circuit, the energy of the second signal could be different from the energy of the first signal. By reasonably arranging the signal processing circuit, the second signal increases or decreases compared with the first signal. This can reduce the EMI radiations generated by the source driving circuit or improve the issue that the signals cannot be accurately transmitted due to their small energy and thus effectively expands the usage scope of the display module.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:
1. A display module, comprising:
a display panel, comprising a plurality of pixel units;
a power management circuit, configured to generate a first signal;

a source driving circuit, electrically connected to the plurality of pixel units;

a signal processing circuit, electrically connected between the source driving circuit and the power management circuit, configured to process the first signal into a second signal and load the second signal to the source driving circuit, wherein an energy of the second signal is different from an energy of the first signal, wherein the first signal comprises a first sub-signal and a second sub-signal; the second signal comprises a third sub-signal and a fourth sub-signal; and the signal processing circuit comprises:

a first sub-signal processing circuit, configured to be loaded with the first sub-signal generated by the power management circuit and process the first sub-signal into the third sub-signal loaded into the source driving circuit, wherein an energy of the third sub-signal is less than an energy of the first sub-signal;

wherein the energy of the second signal is less than the energy of the first signal, a difference between the energy of the third sub-signal and the energy of the first sub-signal is greater than a difference between an energy of the fourth sub-signal and an energy of the second sub-signal.

2. The display module of claim 1, wherein the signal processing circuit further comprises:

a second sub-signal processing circuit, configured to be loaded with a second sub-signal generated by the power management circuit and process the second sub-signal into the fourth sub-signal loaded into the source driving circuit, wherein an energy of the fourth sub-signal is less than an energy of the second sub-signal.

3. The display module of claim 1, wherein the first sub-signal comprises an analog voltage signal, and the second sub-signal comprises a digital voltage signal.

4. The display module of claim 1, further comprising:

a control main board, comprising the power management circuit; wherein the source driving circuit is positioned between the plurality of pixel units and the control main board;

wherein the signal processing circuit is disposed on the control main board.

5. The display module of claim 1, further comprising:

a control main board, comprising the power management circuit; wherein the source driving circuit is positioned between the plurality of pixel units and the control main board;

wherein a flexible flat cable and a connection plate are provided between the source driving circuit and the control main board; the flexible flat cable is connected between the control main board and the connection plate, and the signal processing circuit is disposed on the connection plate.

6. An electrical terminal, comprising a display module, the display module comprising:

a display panel, comprising a plurality of pixel units;

a power management circuit, configured to generate a first signal;

a source driving circuit, electrically connected to the plurality of pixel units;

a signal processing circuit, electrically connected between the source driving circuit and the power management circuit, configured to process the first signal into a second signal and load the second signal to the source driving circuit, wherein an energy of the second signal is different from an energy of the first signal, wherein the first signal comprises a first sub-signal and a second sub-signal; the second signal comprises a third sub-signal and a fourth sub-signal; and the signal processing circuit comprises:

a first sub-signal processing circuit, configured to be loaded with the first sub-signal generated by the power management circuit and process the first sub-signal into the third sub-signal loaded into the source driving circuit, wherein an energy of the third sub-signal is less than an energy of the first sub-signal;

wherein the energy of the second signal is less than the energy of the first signal, a difference between the energy of the third sub-signal and the energy of the first sub-signal is greater than a difference between an energy of the fourth sub-signal and an energy of the second sub-signal.

7. The electrical terminal of claim 6, wherein the signal processing circuit further comprises:

a second sub-signal processing circuit, configured to be loaded with a second sub-signal generated by the power management circuit and process the second sub-signal into the fourth sub-signal loaded into the source driving circuit, wherein an energy of the fourth sub-signal is less than an energy of the second sub-signal.

8. The electrical terminal of claim 6, wherein the first sub-signal comprises an analog voltage signal, and the second sub-signal comprises a digital voltage signal.

9. The electrical terminal of claim 6, wherein the display module further comprises:

a control main board, comprising the power management circuit; wherein the source driving circuit is positioned between the plurality of pixel units and the control main board;

wherein the signal processing circuit is disposed on the control main board; or a flexible flat cable and a connection plate are provided between the source driving circuit and the control main board, the flexible flat cable is connected between the control main board and the connection plate, and the signal processing circuit is disposed on the connection plate.

\* \* \* \* \*